United States Patent [19]
Capon

[11] Patent Number: 5,512,174
[45] Date of Patent: Apr. 30, 1996

[54] FILTERING DEVICE FOR THE CLARIFICATION OF LIQUIDS

[75] Inventor: Bernard Capon, La Celle St Cloud, France

[73] Assignee: Degremont, Rueil Malmaison, France

[21] Appl. No.: 246,137

[22] Filed: May 19, 1994

[30] Foreign Application Priority Data

May 28, 1993 [FR] France .................................. 93 06479

[51] Int. Cl.⁶ ............................ B01D 24/22; B01D 24/46
[52] U.S. Cl. .......................... 210/264; 210/274; 210/275; 210/279; 210/293; 210/333.1
[58] Field of Search .............................. 210/333.1, 264, 210/274, 275, 279, 293, 291

[56] References Cited

U.S. PATENT DOCUMENTS

| | | |
|---|---|---|
| 2,302,450 | 11/1942 | Laughlin . |
| 2,679,319 | 5/1954 | Walker . |
| 2,935,195 | 5/1960 | Dunn . |
| 3,265,370 | 8/1966 | Scholten . |
| 3,282,432 | 11/1966 | Greenleaf . |
| 3,312,348 | 4/1967 | Greenleaf . |
| 3,329,272 | 7/1967 | Roach . |
| 3,613,888 | 10/1971 | Harris . |
| 3,701,423 | 10/1972 | Lindstol . |
| 3,956,134 | 5/1976 | Sturgill . |
| 4,076,625 | 2/1978 | Scholten . |
| 4,118,322 | 10/1978 | San Roman . |
| 4,331,542 | 5/1982 | Emrie . |
| 4,338,202 | 7/1982 | Louboutin . |
| 4,435,286 | 3/1984 | Louboutin . |
| 4,479,880 | 10/1984 | Treanor . |
| 4,604,197 | 8/1986 | Louboutin . |
| 4,746,431 | 5/1988 | Gibaud . |
| 4,976,873 | 12/1990 | Ross . |
| 5,032,294 | 7/1991 | Schulz . |
| 5,078,873 | 1/1992 | Black . |
| 5,089,130 | 2/1992 | Nichols . |
| 5,207,905 | 5/1993 | O'Brian . |

FOREIGN PATENT DOCUMENTS

| | | |
|---|---|---|
| 29468 | 6/1981 | European Pat. Off. . |
| 0036793 | 9/1981 | European Pat. Off. . |
| 2733025 | 1/1978 | Germany . |

OTHER PUBLICATIONS

"Memento Technique de L'Eau" pp. 772–783, vol. 2, 9th Edition; Published by Degremont 1989.

Primary Examiner—Thomas M. Lithgow
Attorney, Agent, or Firm—Pollock, Vande Sande & Priddy

[57] ABSTRACT

A filtering device for the clarification of liquids, such as industrial or waste waters, comprising an open tank provided with a floor possessing nozzles and supporting the filtering bed, side channels for arrival of the untreated water, a removal conduit for the filtered water, means for washing the material of the filter and an axial channel for removal of the washing waters, wherein the bottom of the filter, below the floor, is separated along its longitudinal axis by a watertight partition defining two independent cells in the filter.

3 Claims, 1 Drawing Sheet

FILTERING DEVICE FOR THE CLARIFICATION OF LIQUIDS

FIELD OF THE INVENTION

The present invention relates to improvements made to filtering devices for the clarification of liquids, especially industrial or waste waters.

BACKGROUND OF THE INVENTION

The present proprietor has developed open filters named "AQUAZUR", which are described in particular in the "Mémento Technique de l'Eau" (Technical Review of Water)—page 772–783—Vol. 2—9th Edition—published by the company DEGREMONT—1989—(Editions Lavoisier) to which the reader may refer.

This type of filtering device comprises an open tank made of concrete, comprising a floor which is also generally made of concrete and fitted with nozzles, on which the bed of filtering material is arranged, untreated water being supplied via supply channels arranged laterally along the tank, the filtered water being removed below the floor via an axial, longitudinal conduit. In this type of known filter, the particles of the filtering bed are washed by admitting washing water and air below the floor possessing nozzles, the washing waters being removed via a longitudinal channel arranged along the axis of the tank.

BRIEF DESCRIPTION OF THE INVENTION

These filtering installations are satisfactory. However, the present invention proposes to make improvements thereto which make it possible, in particular, to limit the instantaneous rinsing flow rate on filters with large surface area, given that the limit on producing large filters of this type is currently the instantaneous rinsing flow rate. Moreover, the invention proposes to improve the supplying of such large filters with water to be filtered, by producing equal distribution of this supply over the entire length of the filter. The subject of the present invention is therefore a filtering device for the clarification of liquids, especially industrial or waste waters, of the type comprising an open tank provided with a floor possessing nozzles and supporting the filtering bed, side channels for arrival of the untreated water, a removal conduit for the filtered water, means for washing the material of the filter and an axial channel for removal of the washing waters, this device being characterized in that the bottom of the filter, below the floor, is separated along its longitudinal axis by a watertight partition defining two independent cells in the filter.

According to one characteristic of the present invention, each cell of the filter comprises an inlet for the washing water and a washing air inlet as well as a regulating valve.

According to the invention, the filter comprises only a single washing pump, the latter being provided with a valve for distributing the washing water between the two cells of the filter.

According to yet another characteristic of the present invention, the channels for supplying water to be filtered, which are arranged laterally along the tank of the filter, are designed so as to fulfil a double function:

equal distribution of the water to be treated over the entire length of each cell of the filter during the filtering phase, and equal distribution of the cleansing water used during the phase of washing the filter.

According to another characteristic of the filtering device which forms the subject of the invention, each channel comprises a lower wall inclined towards the inside of the tank of the filter and comprising calibrated orifices and it is extended upwards by a vertical wall provided with orifices with the untreated water to be filtered being introduced through the orifices of the inclined and vertical walls, whereas the cleansing water is introduced via the lower orifices during washing of the cell in question.

Other characteristics and advantages of the present invention will emerge from the description made hereinbelow with reference to the attached drawings which illustrate one embodiment thereof without any limiting character. In the drawings:

DETAILED DESCRIPTION OF THE INVENTION

Figure 1:
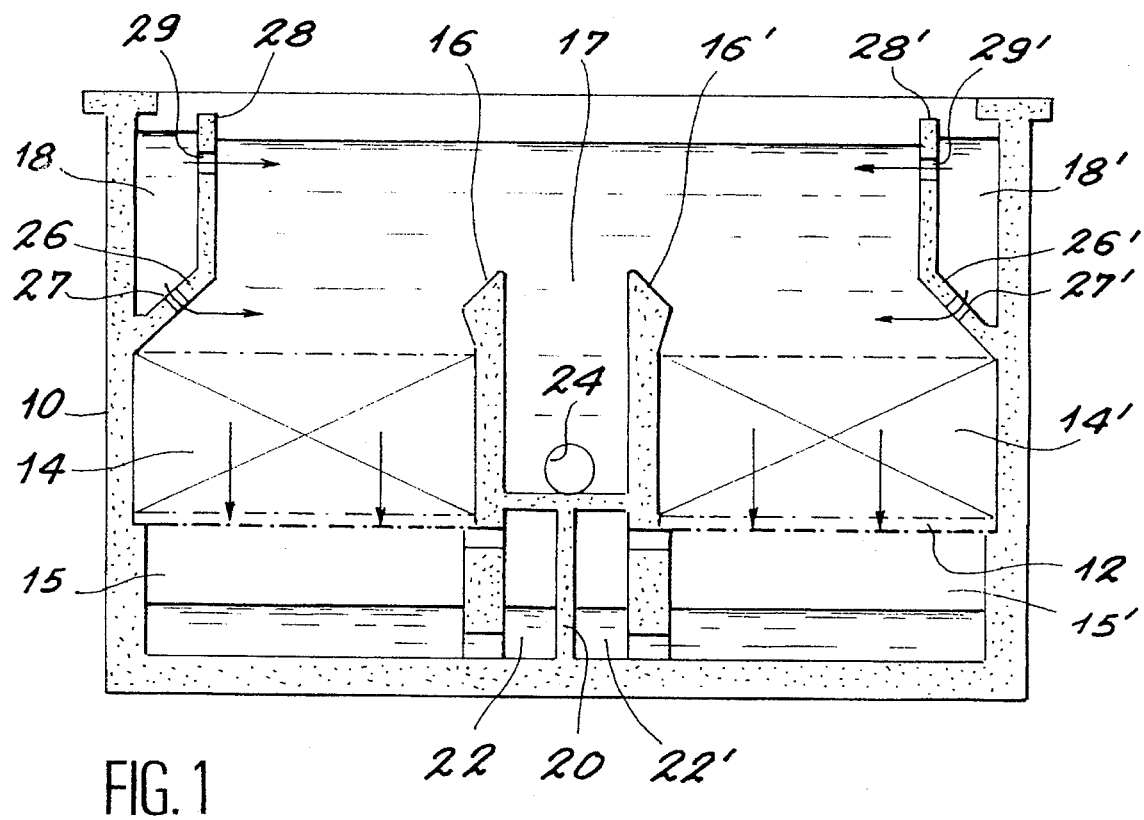
FIG. 1 is a cross-section, through a vertical plane, of a filtering device according to the present invention, represented in the filtering phase.

Referring to the drawings, and more particularly to FIG. 1, a filter according to the present invention has been shown which, as stated hereinabove, constitutes an improvement to the "AQUAZUR" filter designed by the present proprietor.

This is therefore an open filter intended for industrial or waste water clarification installations with a high flow rate and which can be washed simultaneously or successively with air and with water. As is seen in FIG. 1, such a filter is in the form of a tank made of concrete comprising a filter floor 12, generally made of concrete and of the type with nozzles. This floor supports the layer of filtering material 14,14', generally consisting of sand. The untreated water to be filtered is supplied via side channels 18,18'. The washing water and air are introduced, in the phase of washing the filter, below the filtering floor, the washing waters being removed using a conduit 24 placed at the lower part of an axial longitudinal channel 17 defined by two longitudinal partitions 16,16'. These arrangements are described in the work mentioned hereinabove, to which the reader is invited to refer.

In order to limit the instantaneous rinsing flow rate on a filter of the type described hereinabove, of large size, the present invention provides a watertight separating partition 20 below the floor 12 of the filter, making it possible to define two independent filtering cells. In the example considered, each of these cells therefore comprises a filtering bed, 14,14' respectively, an enclosure for collecting the filtered water 15,15' respectively, and a conduit 22,22 ' respectively for removing the filtered water and for supplying washing air and water.

Clearly, the fact that each cell of the filter is made separate leads to the provision of two inlets for the washing water and two inlets for the washing air, as well as two regulating valves slaved to the same level. However, this does not constitute a drawback, in view of the fact that these regulating valves are smaller and hence less expensive than a single valve which would be necessary on a conventional filtering device with a single cell and with a large size.

In the filtering device which forms the subject of the present invention, the channels 18,18' provided on the tank for supplying untreated water which is to be treated are designed so as to produce, on the one hand, equal distribution of the untreated water over the entire length of the filter during the filtering phase and, on the other hand, equal distribution of the cleansing water during the phase of washing the material 14,14' of the filter.

This arrangement makes it possible to avoid the drawbacks which are observed on filtering devices currently produced, which drawbacks result from time lapses between the supply of the untreated water at one of the ends of the filter and its arrival at the opposite end, which time lapses may be detrimental to the filtration, in particular in the case of coagulation on the filter. The imbalances thus observed may be substantial and the development in the nature of the flocculation may lead to different filtering speeds at different places on the filter.

Thus, according to the present invention, each of the channels 18,18' comprises a lower wall 26, 26' respectively, which is inclined towards the inside of the tank and comprises calibrated orifices 27 and 27' respectively, each of these lower walls being extended upwards by a vertical wall 28 and 28' respectively, also provided with orifices 29, 29' respectively.

The filter according to the invention has been represented in FIG. 1 during the filtering phase. It is seen that the untreated water delivered by the channels 18 and 18' is introduced into the tank via the orifices 26, 26', 29, 29', the vertical partitions 28, 28' not being immersed, which makes it possible to obtain a regular supply of the tank of the filter, over the entire length of the tank, which eliminates the drawbacks, mentioned hereinabove, of conventional installations of this type. The water which is filtered by passing over the filtering material 14, 14' of each cell is removed via the independent conduits 22, 22' from each cell.

This type of supply may also be applied to filtering settled water coming from highly loaded untreated water. In this case, the flocculation escaping from the settler still has a high sedimentation speed and preferential settling may be observed towards the supply region. By virtue of the equal distribution of the water, obtained by the above described design of the channels 18, 18' according to the invention, such a phenomenon may be eliminated or at last very substantially reduced.

Figure 2:
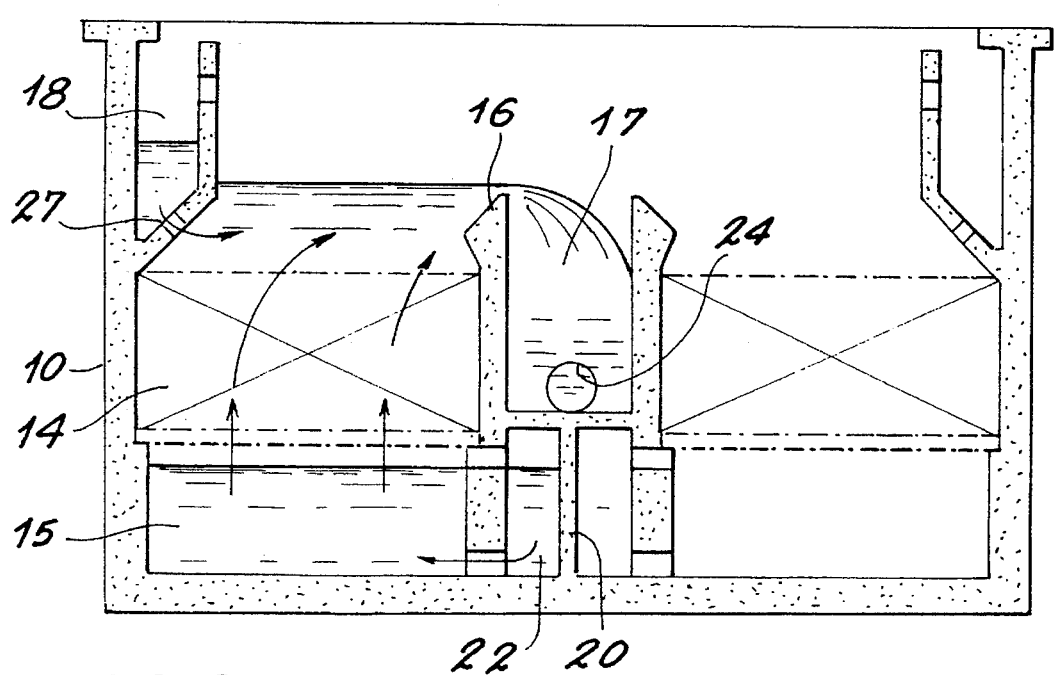
FIG. 2 is a similar view to FIG. 1 representing the filtering device in the washing and cleansing phase of one of its cells.

FIG. 2 represents the filter during the washing phase of one of its cells,(left-hand side when looking at the figure). The washing water 15 and/or the washing air is introduced below the floor of the filter via the conduit 22 and passes through the filtering bed 14, it is swept along by untreated water introduced through the orifices 27 made in the inclined wall 26 of the channel 18 and it is removed over the partition 16 into the axial channel 17 and through the removal conduit 24. This figure clearly shows the feature of the invention according to which each of the cells of the filter can be washed independently of the other.

The arrangements which form the subject of the present invention may be applied in particular:

to sand filters with a high layer height, in which, at the end of the blowing period, sometimes excessive air retention is observed, due to the use of certain reactants (especially cationic polymers);

to granular activated-charcoal filters; for removing the charcoal from the filters it is necessary to fluidize it and the invention makes it possible, by fluidizing only one cell at a time, to economize on water;

to bilayer filters; the rinsing flow rates normally applied on this type of filter vary from 40 to 60 m/h, which leads to extremely high instantaneous flow rates for filters with a large surface area (for example 12,000 m$^3$/h for a filter of 200 m$^2$)—Washing by individual cell makes it possible to divide these flow rates by two, with the result which this has not only on the washing pumps, the manifolds, etc., but also on the conduits and the washing water removal network.

It remains obvious that the present invention is not limited to the embodiments described and/or represented, and that it and encompasses all variants thereof.

We claim:

1. A filtering device for clarification of waste water, comprising:

an open tank provided with side walls, a base, and a floor positioned in parallel spaced relation to the base;

the floor incorporating nozzles for permitting fluid communication between spaces located above and below the floor;

first parallel spaced vertical partitions extending above the floor and forming an axial channel extending the length of the tank that serves as a conduit for removing wash water during a cleaning phase;

second parallel spaced vertical partitions extending below the floor that serve as conduits for removal of filtered waste water during a filtering phase and also to introduce pressured water and air to the nozzles during a cleaning phase said second parallel spaced vertical partitions having a watertight partition therebetween defining two adjacent axial channels extending the length of the tank;

filter material supported by the floor and contained between the side walls and outward surfaces of the first vertical partitions;

The first and second partitions and said watertight partition effectively dividing the filtering device into two independent cells;

side channels formed on opposite side walls of the tank for supplying waste water to each cell of the filtering device, wherein each channel includes (a) an upwardly inclined wall section extending from the side wall of the tank and including calibrated lower orifices through which waste water flows into the tank at controlled rates during a filtering phase, and through which wash water flows during a cleaning phase;

(b) an upwardly extending vertical wall section extending from the inclined wall section of the tank and including upper calibrated orifices through which waste water flows into the tank at controlled rates.

(c) the calibrated orifices in the side channels subjecting each cell to equal distribution of waste water over the entire length of each cell, during a filtering phase, and equal distribution of wash water through the side channels during the cleaning phase.

2. A filtering device as set forth in claim 1 further comprising:

inlet means communicating with each cell for introducing wash water and air during a cleaning phase; and valve means connected to the inlet means for regulating the flow of wash water and air during the cleaning phase.

3. A filtering device as set forth in claim 1 further comprising a single wash water pump and a connected diverter valve means for selectively providing wash water to either cell.

* * * * *